United States Patent [19]

Edelson

[11] 4,258,870

[45] Mar. 31, 1981

[54] PANNIER BAGS AND DEVICE FOR ATTACHMENT TO BICYCLE

[76] Inventor: Jack Edelson, 1161 Mission St., San Francisco, Calif. 94103

[21] Appl. No.: 118,417

[22] Filed: Feb. 4, 1980

[51] Int. Cl.[3] .............................................. B62J 9/00
[52] U.S. Cl. ...................................... 224/32 A; 224/39
[58] Field of Search ............... 224/32 A, 32 R, 30 R, 224/31, 33 R, 37, 39, 42, 42.42 R, 42.45 R, 42.46 R

[56] References Cited

U.S. PATENT DOCUMENTS

| | | | |
|---|---|---|---|
| 3,937,374 | 2/1976 | Hine, Jr. | 224/32 A |
| 3,989,174 | 11/1976 | Norinsky | 224/32 A X |
| 4,174,795 | 11/1979 | Jackson et al. | 224/32 A |

FOREIGN PATENT DOCUMENTS 836783  10/1938  France ................................ 224/32 A Primary Examiner—Steven M. Pollard
Attorney, Agent, or Firm—Alfons Puishes

[57] ABSTRACT

Carrier bags known as panniers are adapted for mounting upon the existing rear luggage carrier of a bicycle by means of specially constructed brackets arranged for mounting across the carrier frame. A novel construction and combination permits ready attachment of the brackets to the carrier and provides for secure attachment of the panniers to the bicycle frame during motion of the bicycle without resort to elaborate structures heretofore used for this purpose.

4 Claims, 7 Drawing Figures

PANNIER BAGS AND DEVICE FOR ATTACHMENT TO BICYCLE

BACKGROUND OF THE INVENTION

The increased use of bicycles and bicyle travel has accentuated the problem of providing proper carriers for personal effects, paraphernalia, and so on, of the person on the bicycle. The requirements generally are that the carrier bags, or so-called panniers, may be readily secured to existing luggage racks on bicycles and yet be secure against movement of the bicycle while it is in motion.

Many different devices and methods have been used to accomplish this result in the past and the prior patent art as known presently to the applicant is summarized briefly below.

U.S. Pat. No. 1,102,105 to Marrs discloses parcel carriers for motorcycles, in this case, which are suspended by means of leaf springs from the frame of the cycle and steadied from the rear axle. Positive insurance against sidewise motion and ease of installation are not provided for.

U.S. Pat. No. 1,963,333 to Morales discloses a carrier which straddles the rear wheel of a bicycle, is screwed to the mud guard and strap fastened to the frame. No positive protection against lateral or other motion is provided for.

U.S. Pat. No. 3,039,663 to Glenny also discloses carrier baskets supported from the rear bicycle fender with "C" shaped jaws for clearance adjustment. It represents a flimsy construction at best.

U.S. Pat. No. 3,934,770 to Larsen discloses a pair of collapsible baskets constructed with scissor-like sides and with the latter exception there is nothing novel or superior about the method of fastening to the bicycle.

U.S. Pat. No. 3,874,574 to Heise discloses an "L" shaped holder supported from the side of a bicycle frame and the method of support is designed primarily to make it readily removable for use as a portable carrier. No special support features are disclosed for the pannier.

U.S. Pat. No. 3,989,174 to Norinsky discloses a briefcase in combination with means for attaching to a bicycle and its novelty resides in the brief-case and bicycle combination with corresponding method of support which is quite unlike that of applicants.

U.S. Pat. No. 4,050,615 to Kline discloses what he calls a rigid saddle bag which straddles the rear wheel and is fastened to the axle by means of support brackets. Novelty seems to reside within the construction of the rigid bag itself, as a permanent fixture to a bicycle.

U.S. Pat. No. 3,786,972 to Alley comes closer to applicant's invention in that it endeavors to adapt a pair of pannier bags to an existing bicycle luggage rack. The distinguishing feature is the bag construction which permits it to be used as a back-pack when removed from the bicycle. An elaborate method of fastening to the bicycle frame is disclosed.

U.S. Pat. No. 3,937,374 to Hine purports to be an improvement over Alley above. It provides for rigidity of the bag walls and likewise employs an elaborate system of links and springs to fasten it to an existing bicycle luggage rack.

None of the prior art accomplishes applicant's purpose which is to provide a ready and simple method of attachment of carrier bags to a luggage carrier while insuring that they would be free from movement or dislocation in any direction while the bicycle is in motion, particularly over rough terrain. None of the support structures disclose positive lateral supports attached to a frame in the manner of applicant in order to prevent undesirable movement of the bags.

SUMMARY OF THE INVENTION

I have invented a pair of pannier bags and a method of attaching them to a bicycle luggage carrier which overcomes the objections to previous devices of this class and supplies a long felt need in this area.

Specifically, I provide a specially constructed pair of brackets which are fastened to the luggage carrier with prongs at right angles to the direction of travel to the bicycle. These brackets are secured to the luggage carrier by means of special strap fastenings, although other fastening means may also be used. The brackets comprise a fastening section for securing to the luggage carrier as well as projecting prongs for holding the pannier bags in position. The bags themselves are equipped with loops or eyes which form an integral part of the bags positioned across the ends of the bags and designed to accept the prongs of the brackets through them. The latter are equipped with hooked ends to insure against movement of the bags in a direction cross-wise of the bicycle. The brackets themselves supply lateral as well as a forward and aft support for the bags and together they form a rectangular structural frame which also prevents the bags from rotating in a horizontal plane and thus interfering with the movement of the bicycle wheel which is a difficulty encountered with previous devices of this kind.

DESCRIPTION OF A PREFERRED EMBODIMENT

Figure 1:
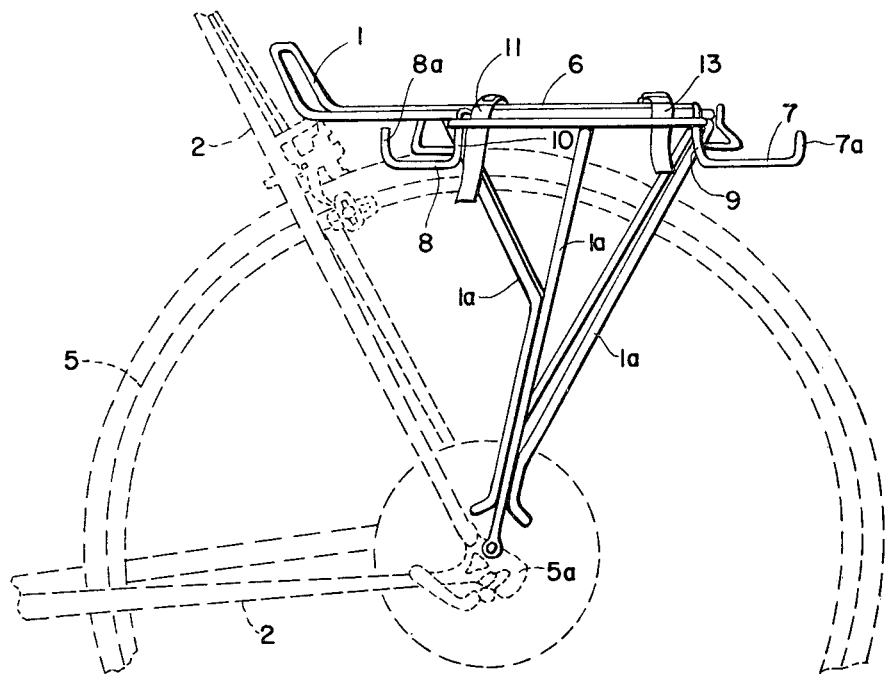
FIG. 1 is a partial side elevation of a rear luggage bicycle carrier rack in position and the attachment brackets for pannier bags with a partial view of a bicycle rear wheel and rear wheel frame shown in phantom.
Figure 2:
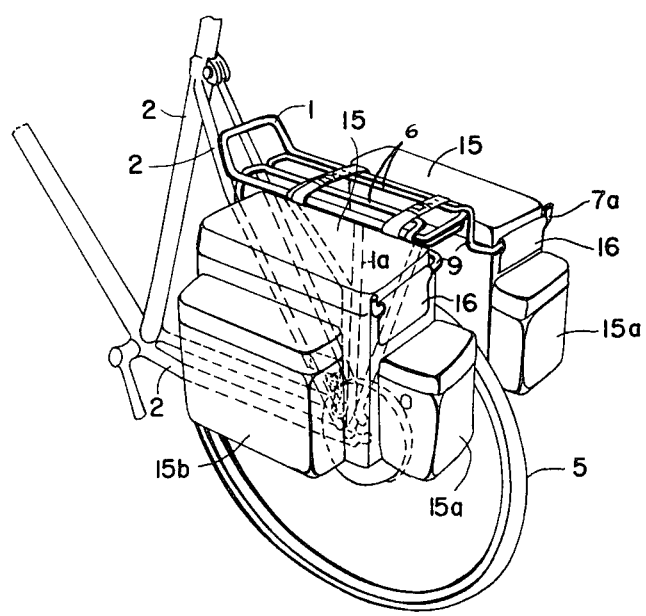
FIG. 2 is a perspective view of the pannier bags in position on a rear end bicycle luggage carrier mounted in accordance with my invention.
Figure 3:
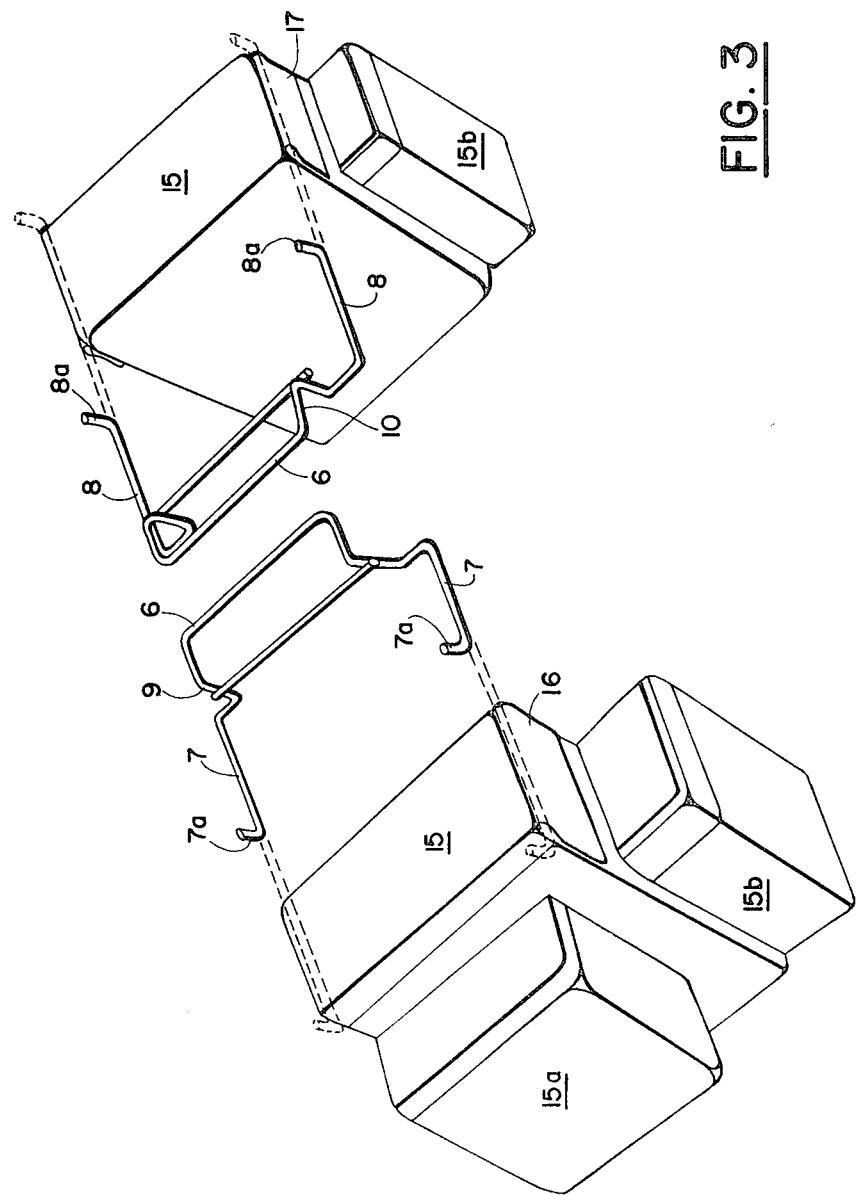
FIG. 3 is an exploded view showing the special attachment brackets and method of connecting to the pannier bags on both sides of a bicycle carrier rack.

Referring now to the figures there is seen an existing luggage carrier 1 mounted on the rear of a bicycle, including its rack and frame. The vertical support members for carrier 1 are shown at 1a, the longitudinal members of the rack at 1b and the cross-members at 1c.

The bicycle frame members are shown at 2, the bicycle drive chain at 3 and the support sprockets at 4.

The bicycle rear wheel is shown at 5 and the bicycle frame support is shown at 5a, positioned on the rear axle.

The brackets 6 which hold the pannier bags to the frame comprise a pair of cross-wise prongs 7 and 8 as shown and their hooked ends 7a and 8a respectively. The respective parts of the attachment brackets 6 engage longitudinal members 1b of the luggage carrier rack as shown at 9 and 10 respectively for the rear and front bracket prongs.

A front belt fastener 11 is disposed for securing the front end of attachment brackets 6 to carrier rack 1 through buckle 12 and in like manner rear belt 13 is disposed for fastening rear end of brackets 6 to frame 1 through buckle 14. These belts may be made of nylon or similar material although other methods of fastening may be used.

The main pannier bags 15 may be made of coated waterproof nylon cloth as may the rear auxiliary bags 15b which are secured by sewing, or otherwise, to and essentially form a part of the main bags 15.

Positioned across the ends of main pannier bags 15 are end loops or eyes 16 for engaging with rear bracket prongs 7 and corresponding loops or eyes 17 for engagement with front bracket prongs 8. These loops or eyes may be sewed on or otherwise fastened to the body of bags 15.

Figure 5:
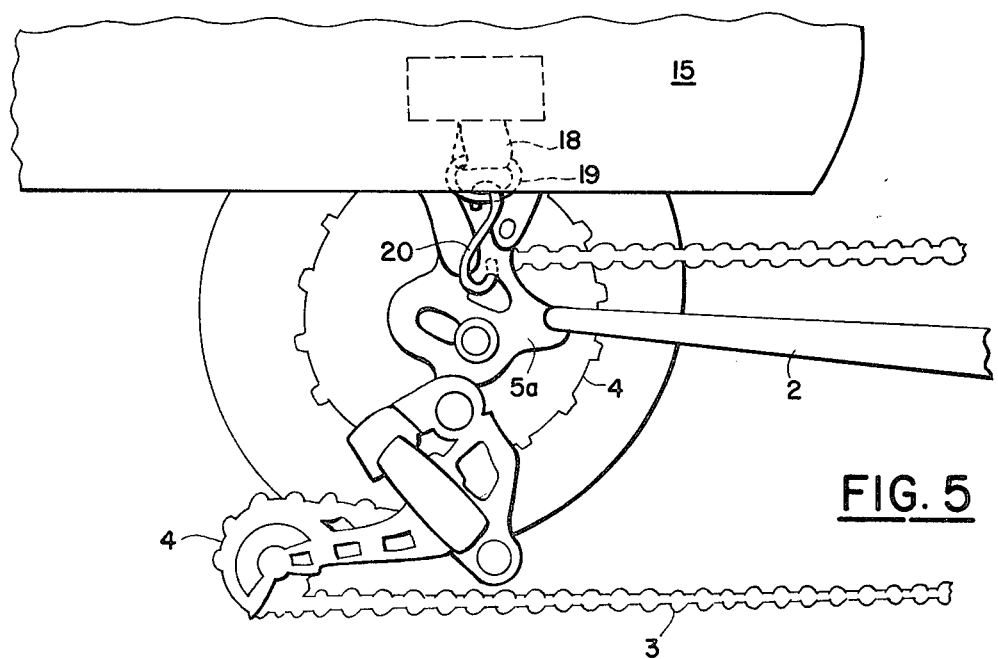
FIG. 5 is a partial side elevation of the bottom of the main pannier bag showing its method of attachment to the bicycle frame.
Figure 6:
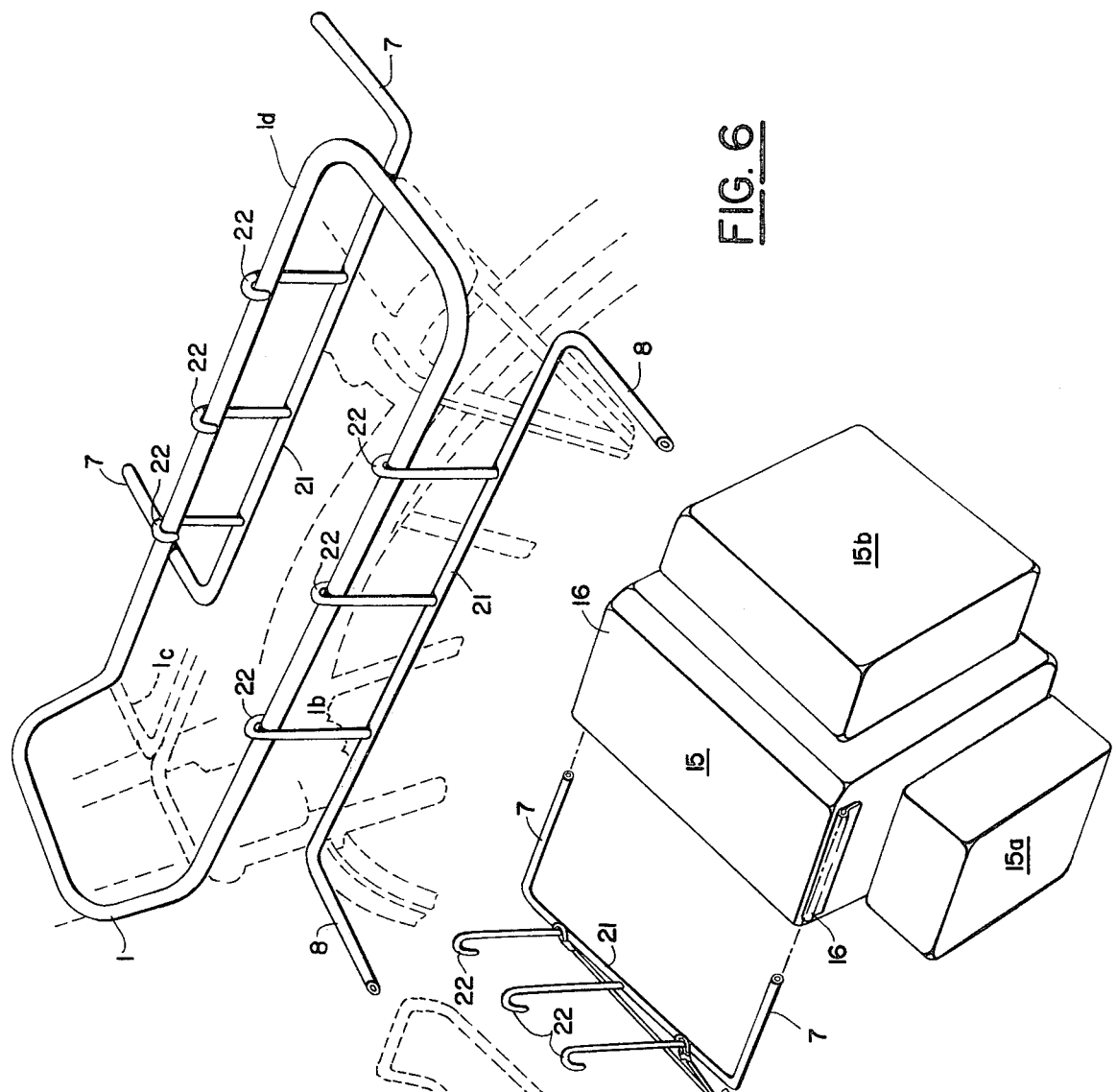
Figure 7:
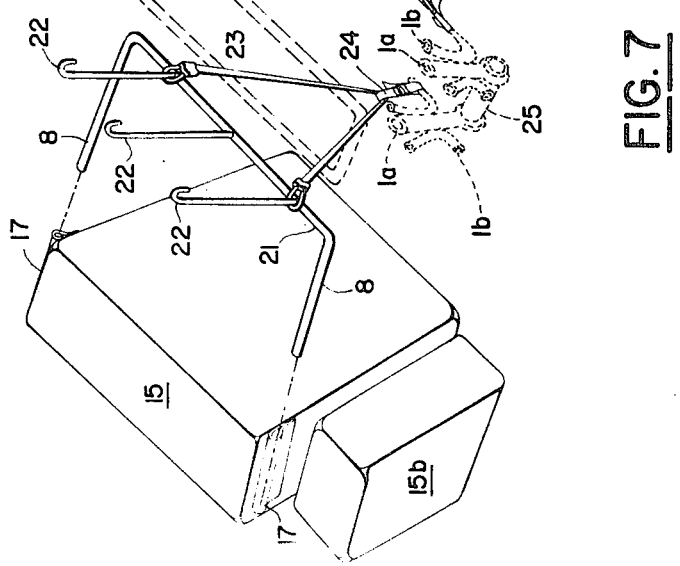

Referring now more particularly to FIG. 5 there are seen loops or eyes 18 which may be sewed or otherwise fastened to and form a part of the pannier bags 15 engaging "D" rings 19, the latter engaging in turn with "S" hooks 20 which in turn engage with bicycle frame support 5a and disposed to hold the bag assembly secure in a vertical plane.

Figure 4:
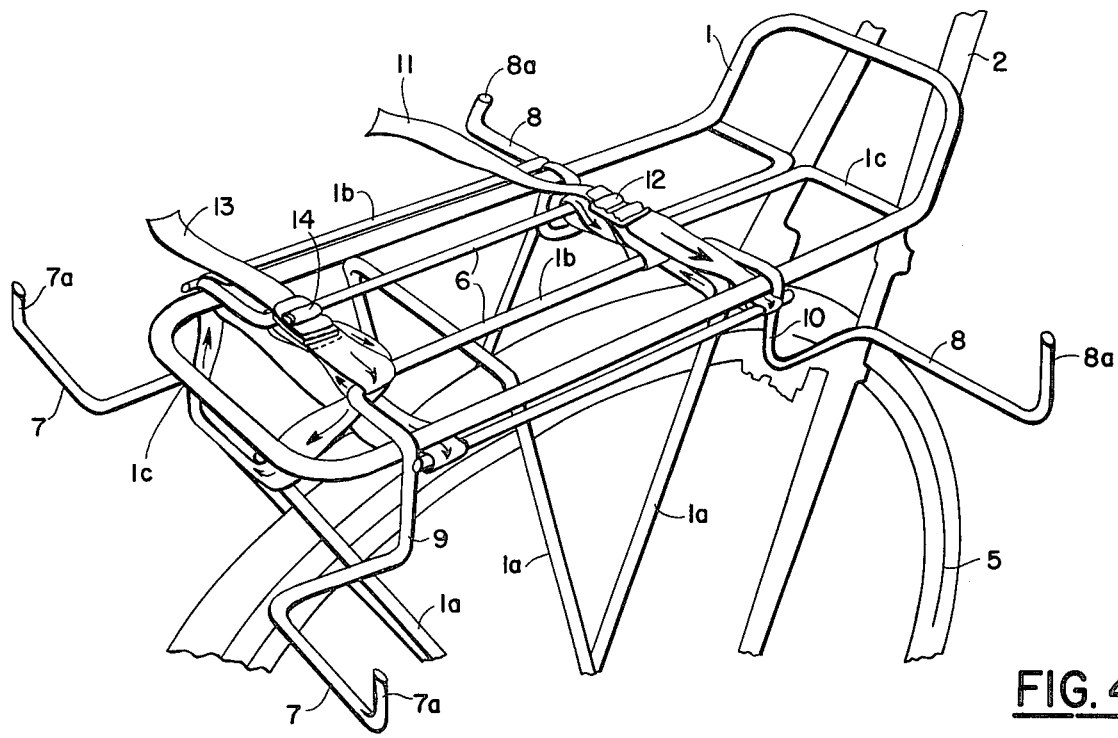
FIG. 4 is a perspective showing the method of fastening the attachment brackets to a bicycle rear end luggage carrier.

It is evident from the drawings and particularly FIG. 4 that belts 11 and 13 are disposed to hold brackets 6 in tight contact with members 1b and 1c of the luggage carrier to restrain movement side-ways and in a fore and aft direction. The prongs 7 and 8 are disposed to prevent motion of the pannier bags in any direction in a horizontal plane while the prong ends 7a and 8a prevent the bags from slipping off of the attachment brackets.

It is also evident that the combined action of eye 18, "D" ring 19 and hooks 20 hold the bags securely in a vertical direction.

Thus it is evident that I am able to provide a secure and stable attachment of pannier bags to a bicycle without resorting to the complicated combinations of linkages and springs heretofore engaged as set forth in the cited prior art. The combined action of the horizontal cross-wise bracket prongs with the eyes in the bags is such as to form a rectangular box-like structure insuring against movement of the bags in any direction.

I claim:

1. A device for attachment of a pair of pannier bags to the opposite sides of a rear end luggage carrier rack of a bicycle comprising the combination of:
   a pair of brackets disposed for positioning upon the top of said carrier rack;
   said brackets comprising a frame section and oppositely spaced transversely projecting prong sections;
   said frame section being disposed for engaging longitudinal members of said carrier rack;
   means for fastening said frame section to said carrier rack;
   loop members positioned upon and forming a part of adjacent opposite vertical end faces of said pannier bags;
   said prong sections of said brackets being disposed for projection through said loop members;
   hooked ends positioned upon and forming a part of the outer extremities of said prong sections;
   means for fastening the bottom of said pannier bags to the frame of said bicycle;
   whereby movement of said bags in any direction as well as twisting in a horizontal plane while said bicycle is in motion is prevented.

2. The combination of claim 1 in which said means for fastening said frame sections of said brackets to said carrier rack comprises:
   a pair of belts;
   said belts being disposed to engage in turn longitudinal members of said carrier rack, frame sections of said brackets, and cross-wise members of said carrier rack;
   a buckle positioned on one end of each of said belts;
   said buckles being disposed for tight engagement of said belts in fixed position;
   thereby preventing relative motion between said brackets and said carrier rack.

3. The combination of claim 1 in which said means for fastening the bottom of said pannier bags to the frame of said bicycle comprises:
   a loop positioned upon and forming a part of the side of said bags near their respective lower edges;
   "D" rings engaged by said loop;
   "S" hooks, a first end of each hook engaging one of said "D" rings;
   openings in the frame of said bicycle adjacent to the axle on opposite sides thereof;
   a second end of said "S" hooks engaging said openings.

4. The combination of claim 1 in which said hooked ends on the extremities of said prong sections are disposed to engage the outer edges of said loop members thereby preventing transverse movement of said bags relative to said prong sections.

* * * * *